(12) United States Patent
Khan et al.

(10) Patent No.: US 8,744,220 B2
(45) Date of Patent: Jun. 3, 2014

(54) OPTICAL WAVEGUIDE DEVICE AND MANUFACTURING METHOD THEREOF

(75) Inventors: Sazzadur Rahman Khan, Ibaraki (JP); Kazunori Mune, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 174 days.

(21) Appl. No.: 12/761,612

(22) Filed: Apr. 16, 2010

(65) Prior Publication Data

US 2010/0201011 A1    Aug. 12, 2010

Related U.S. Application Data

(62) Division of application No. 12/123,710, filed on May 20, 2008, now Pat. No. 8,655,118.

(60) Provisional application No. 60/954,708, filed on Aug. 8, 2007.

(30) Foreign Application Priority Data

May 24, 2007  (JP) ................................. 2007-137643

(51) Int. Cl.
| | |
|---|---|
| *G02B 6/12* | (2006.01) |
| *G02B 6/26* | (2006.01) |
| *G02B 6/42* | (2006.01) |
| *G02B 6/36* | (2006.01) |

(52) U.S. Cl.
USPC ............ 385/14; 385/38; 385/31; 385/88

(58) Field of Classification Search
USPC ............ 385/14, 31, 38, 88, 91; 250/227.11
See application file for complete search history.

(56) References Cited

U.S. PATENT DOCUMENTS 4,772,787 A    9/1988    Trommer
(Continued)

FOREIGN PATENT DOCUMENTS

| EP | 0192850 A1 | 9/1986 |
|---|---|---|
| JP | 61-161759 A | 7/1986 |

(Continued)

OTHER PUBLICATIONS

European Search Report dated Aug. 25, 2008, issued in corresponding European Patent Application No. 08009279.

(Continued)

*Primary Examiner* — Uyen Chau N Le
*Assistant Examiner* — John M Bedtelyon
(74) *Attorney, Agent, or Firm* — Westerman, Hattori, Daniels & Adrian, LLP

(57) ABSTRACT

An optical waveguide device which is free from interference with an optical path between a light emitting element and an optical waveguide thereof, and to provide a method of manufacturing the optical waveguide device. A light emitting element (5) is provided on an upper surface of a first under-cladding layer (21), and a second under-cladding layer (22) is provided on the upper surface of the first under-cladding layer (21), covering the light emitting element (5). A core 3 which receives light emitted from the light emitting element (5) through the second under-cladding layer (22) is provided on an upper surface of the second under-cladding layer (22). The core (3) is located in a position such that the light emitted from the light emitting element (5) is incident on the core (3).

3 Claims, 3 Drawing Sheets

(56) References Cited

U.S. PATENT DOCUMENTS

| | | | |
|---|---|---|---|
| 5,767,508 | A | 6/1998 | Matsui et al. |
| 5,914,709 | A | 6/1999 | Graham et al. |
| 5,999,670 | A * | 12/1999 | Yoshimura et al. ............ 385/31 |
| 6,205,274 | B1 * | 3/2001 | Zhou ............................... 385/38 |
| 6,733,189 | B2 | 5/2004 | Hurt et al. |
| 6,935,792 | B2 | 8/2005 | Saia et al. |
| 7,162,127 | B2 | 1/2007 | Ohtsu et al. |
| 7,212,713 | B2 | 5/2007 | Fukuzawa et al. |
| 7,343,060 | B2 * | 3/2008 | Ohtsu et al. .................... 385/14 |
| 2004/0076382 | A1 | 4/2004 | Saia et al. |
| 2005/0117833 | A1 | 6/2005 | Fukuzawa et al. |
| 2005/0286831 | A1 | 12/2005 | Ohtsu et al. |
| 2007/0110359 | A1 | 5/2007 | Okubora |

FOREIGN PATENT DOCUMENTS

| | | | |
|---|---|---|---|
| JP | 9-73026 | A | 3/1997 |
| JP | 2000-39530 | A | 2/2000 |
| JP | 2000-235127 | A | 8/2000 |
| JP | 2001-100063 | A | 4/2001 |
| JP | 2004-170668 | A | 6/2004 |
| JP | 2005-078022 | A | 3/2005 |
| JP | 2007-293239 | A | 11/2007 |

OTHER PUBLICATIONS

Chinese Office Action dated Jan. 25, 2011, issued in corresponding Chinese Patent Application No. 2008101756701.
Japanese Office Action dated Jun. 7, 2011 (mailing date), issued in corresponding Japanese Patent Application No. 2007-137643.
Decision to Grant a Patent dated Sep. 6, 2011, issued in corresponding Japanese Patent Application No. 2007-137643.
U.S. Non-Final Office Action dated Apr. 2, 2010, issued in related U.S. Appl. No. 12/123,710.
U.S. Final Office Action dated Oct. 5, 2010, issued in related U.S. Appl. No. 12/123,710.
U.S. Non-Final Office Action dated Mar. 31, 2011, issued in related U.S. Appl. No. 12/123,710.
U.S. Final Office Action dated Oct. 4, 2011, issued in related U.S. Appl. No. 12/123,710.
U.S. Non-Final Office Action dated Apr. 3, 2012, issued in related U.S. Appl. No. 12/123,710.
U.S. Final Office Action dated Nov. 26, 2012, issued in related U.S. Appl. No. 12/123,710.
U.S. Non-Final Office Action dated Jun. 26, 2013, issued in related U.S. Appl. No. 12/123,710.
Notice of Allowability dated Oct. 3, 2013, in U.S. Appl. No. 12/123,710.
Korean Office Action dated Nov. 12, 2013, issued in corresponding Korean Patent Application No. 10-2008-0047464, w/ English translation.

* cited by examiner

OPTICAL WAVEGUIDE DEVICE AND MANUFACTURING METHOD THEREOF

RELATED APPLICATIONS

This application is the division of the U.S. application of Ser. No. 12/123,710 filed May 20, 2008 which claims the benefit of U.S. Provisional Application No. 60/954,708, filed Aug. 8, 2007, which are hereby incorporated by reference.

BACKGROUND OF THE INVENTION

1. Field of the Invention

The present invention relates to an optical waveguide device which is widely used for optical communications, optical information processing and other general optics, and to a method of manufacturing the optical waveguide device.

2. Description of the Related Art

In general, optical waveguide devices are configured such that light emitted from a light emitting element is transmitted through an optical waveguide (see, for example, U.S. Pat. No. 5,914,709). Such an optical waveguide device is schematically illustrated in FIG. 5. In FIG. 5, the optical waveguide device includes an optical waveguide provided on a substrate 10, and a light emitting element 50 fixed to the substrate 10 by an adhesive A in spaced relation from one end of the optical waveguide. A light beam L from the light emitting element 50 is incident on one end face of a core 30 of the optical waveguide, then transmitted through the core 30, and output from the other end face of the core 30. In FIG. 5, a reference numeral 20 denotes an under-cladding layer, and a reference numeral 40 denotes an over-cladding layer.

In the optical waveguide device, however, the adhesive A is liable to protrude to interfere with an optical path when the light emitting element 50 is pressed from the above for bonding thereof.

SUMMARY OF THE INVENTION

In view of the foregoing, it is an object of the present invention to provide an optical waveguide device which is free from interference with an optical path between a light emitting element and an optical waveguide thereof, and to provide a method of manufacturing the optical waveguide device.

According to a first aspect of the present invention to achieve the aforementioned object, there is provided an optical waveguide device, which comprises: a light emitting element provided on an upper surface of a first under-cladding layer; a second under-cladding layer provided on the upper surface of the first under-cladding layer, covering the light emitting element; and a core provided on an upper surface of the second under-cladding layer in a position such that light emitted from the light emitting element is incident on the core, the core being adapted to receive the emitted light through the second under-cladding layer.

According to a second aspect of the present invention, there is provided an optical waveguide device manufacturing method, which comprises the steps of: placing a light emitting element on an upper surface of a first under-cladding layer; forming a second under-cladding layer on the upper surface of the first under-cladding layer to cover the light emitting element; and forming a core on an upper surface of the second under-cladding layer in a position such that light emitted from the light emitting element is incident on the core, the core being adapted to receive the emitted light through the second under-cladding layer.

The inventors of the present invention conducted studies on the construction of the optical waveguide device to eliminate the interference with the optical path between the light emitting element and the optical waveguide in the optical waveguide device. As a result, the inventors came up with an idea of burying and fixing the light emitting element in an under-cladding underlying the core to allow the core to receive light emitted from the light emitting element through the under-cladding, and further conducted experiments and studies. Consequently, the inventors attained the present invention, in which the aforementioned object is achieved based on this idea.

In the inventive optical waveguide device, the light emitting element is provided on the upper surface of the first under-cladding layer, and the second under-cladding layer is provided on the upper surface of the first under-cladding layer, covering the light emitting element. Therefore, the light emitting element is buried and fixed in an under-cladding configured as a laminate of the first under-cladding layer and the second under-cladding layer. This obviates the use of an adhesive for the fixing of the light emitting element, or eliminates the possibility of protrusion of the adhesive from the periphery of the light emitting element if a very small amount of the adhesive is used for tentatively fixing the light emitting element on the upper surface of the first under-cladding layer prior to the formation of the second under-cladding layer. The inventive optical waveguide device ensures proper light transmission between the light emitting element and the core without the possibility that the adhesive interferes with the optical path. Further, the light emitted from the light emitting element is received on a bottom surface of the core through the second under-cladding layer, so that the core has a greater light receiving area than in the conventional case in which the light is received by the one end face of the core. Thus, the light transmission is more reliably achieved.

Particularly, one end portion of the core serves as a light receiving portion for receiving the light emitted from the light emitting element, and an end surface of the light receiving portion is inclined at an angle of 45 degrees with respect to the bottom surface of the core. Further, the light emitted from the light emitting element is projected at an angle of 45 degrees with respect to the inclined surface. In this case, the light emitted from the light emitting element is reflected on the inclined surface, whereby the optical path is efficiently deflected to extend longitudinally of the core. Thus, the light transmission efficiency is improved.

In the inventive optical waveguide device manufacturing method, the light emitting element is placed on the upper surface of the first under-cladding layer, and then the second under-cladding layer is formed on the upper surface of the first under-cladding layer to cover the light emitting element. Thereafter, the core which receives the light emitted from the light emitting element through the second under-cladding layer is formed on the upper surface of the second under-cladding layer in the position such that the light emitted from the light emitting element is incident on the core. Therefore, the inventive optical waveguide device can be provided, which ensures proper and highly reliable light transmission.

A light-receiving end surface of the core is formed inclined at an angle of 45 degrees with respect to the bottom surface of the core, and positioned so that the light emitted from the light emitting element is projected at an angle of 45 degrees with respect to the inclined surface. In this case, the light emitted from the light emitting element is reflected on the inclined surface, whereby the optical path is efficiently deflected to extend longitudinally of the core. Thus, the optical waveguide device is improved in light transmission efficiency.

Where one end portion of the core is cut by moving a blade having an edge angle of 90 degrees along a light projection axis of the light emitting element for the formation of the inclined light-receiving end surface of the core, the blade can be easily positioned. This makes it possible to accurately and easily position the inclined surface.

DETAILED DESCRIPTION OF PREFERRED EMBODIMENTS

Embodiments of the present invention will hereinafter be described in detail with reference to the attached drawings.

Figure 1:
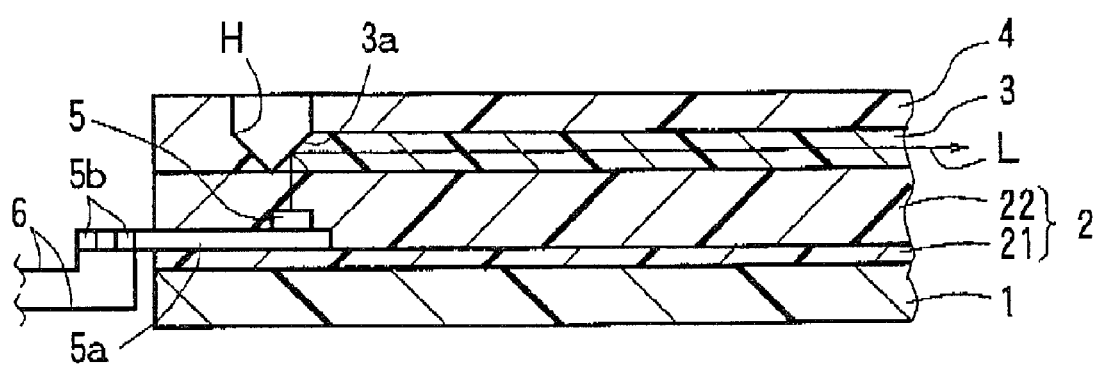
FIG. 1 is a sectional view schematically illustrating an optical waveguide device according to one embodiment of the present invention.

FIG. 1 illustrates an optical waveguide device according to one embodiment of the present invention. In this embodiment, the optical waveguide device is provided on an upper surface of a substrate 1. In the optical waveguide device, a light emitting element 5 is buried and fixed in an under-cladding 2 including a first under-cladding layer (lower layer) 21 and a transparent second under-cladding layer (upper layer) 22 stacked one on the other, and a core 3 serving as a path of a light beam L is provided in a predetermined pattern on an upper surface of the second under-cladding layer 22. In this embodiment, an over-cladding layer 4 is provided which covers the core 3. The light emitting element 5 is adapted to project the light beam L vertically upward, and one end portion of the core 3 serving as a light receiving portion is positioned just above the light emitting element 5. An end surface 3a of the light receiving portion is inclined at an angle of 45 degrees with respect to a bottom surface of the core 3. In FIG. 1, a reference character 5a denotes a lead frame having one end portion on which the light emitting element 5 is fixed, and the other end portion provided with terminals (wiring connection portions) 5b connected to the light emitting element 5. Further, a reference character H denotes a cut hole which is formed by means of a rotary blade D (see FIG. 2(f)) for forming the inclined surface 3a on the light receiving portion.

The light beam L projected vertically upward from the light emitting element 5 passes through the second under-cladding layer 22, and is incident on a bottom surface of the one end portion of the core 3 to enter the core 3. Then, the light beam L is reflected on the inclined surface 3a at an angle of 45 degrees, whereby an optical path is deflected to extend longitudinally of the core 3. Then, the light beam L travels along the length of the core 3, and is output from the other end surface of the core 3.

An exemplary production method for the optical waveguide device will be described.

Figure 2A:
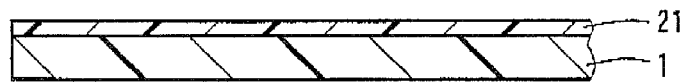
FIGS. 2(a) to 2(f) are explanatory diagrams schematically showing an optical waveguide device production method according to the present invention.

First, a planar substrate 2 (see FIG. 2(a)) is prepared. The substrate 1 is not particularly limited, but exemplary materials for the substrate 1 include glass, quartz, silicon, resins and metals. The thickness of the substrate 1 is not particularly limited, but is typically in the range of 20 μm to 5 mm.

In turn, a first under-cladding layer 21 is formed in a predetermined region of an upper surface of the substrate 1 as shown in FIG. 2(a). Examples of a material for the formation of the first under-cladding layer 21 include photosensitive resins, polyimide resins and epoxy resins. The formation of the first under-cladding layer 21 is achieved in the following manner. A varnish prepared by dissolving any of the aforementioned resins in a solvent is applied on the substrate 1. The application of the varnish is achieved, for example, by a spin coating method, a dipping method, a casting method, an injection method, an ink jet method or the like. Then, the varnish is cured. Where a photosensitive resin is employed as the material for the formation of the first under-cladding layer 21, the curing is achieved by exposing the applied varnish to radiation. An exposed portion of the varnish serves as the first under-cladding layer 21. Where a polyimide resin is employed as the material for the formation of the first under-cladding layer 21, the curing is typically achieved by a heat treatment at 300° C. to 400° C. for 60 to 180 minutes. The thickness of the first under-cladding layer 21 is typically in the range of 5 to 50 μm. Thus, the first under-cladding layer 21 is formed.

Figure 2B:

Next, a light emitting element 5 is placed together with a lead frame 5a in a predetermined position on an upper surface of the first under-cladding layer 21 as shown in FIG. 2(b). At this time, terminals (wiring connection portions) 5b provided on the other end portion of the lead frame 5a are positioned outward of an edge of the first under-cladding layer 21. The placement of the light emitting element 5 may be achieved with the use of no adhesive or with the use of a very small amount of an adhesive for tentative fixing thereof. This is because the light emitting element 5 is fixed in the subsequent step (see FIG. 2(c)), in which a transparent second under-cladding layer 22 is formed on the upper surface of the first under-cladding layer 21 in the same manner as in the formation of the first under-cladding layer 21 to cover the light emitting element 5. Examples of a material for the formation of the second under-cladding layer 22 include those employed as the material for the formation of the first under-cladding layer 21, but a transparent one is selected from those materials. Typically employed as the light emitting element 5 is a light emitting diode, a laser diode, a VCSEL (Vertical Cavity Surface Emitting Laser) or the like.

Figure 2C:
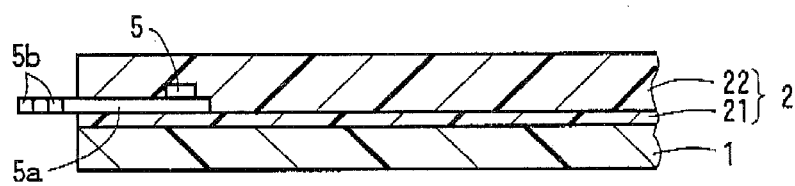

Thus, the light emitting element 5 is buried and fixed in an under-cladding 2 configured as a laminate of the first under-cladding layer 21 and the second under-cladding layer 22 as shown in FIG. 2(c). In this state, the terminals (wiring connection portions) 5b of the light emitting element 5 are exposed out of an end face of the under-cladding 2.

Figure 2D:
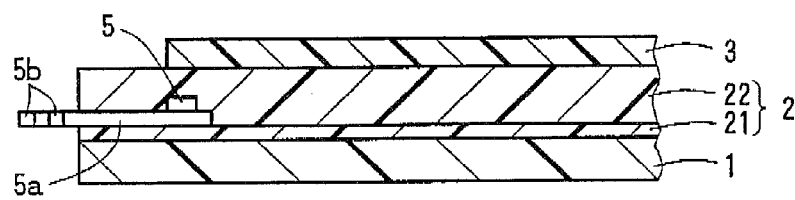

Subsequently, a core 3 is formed on an upper surface of the second under-cladding layer 22 as shown in FIG. 2(d). At this time, one end portion of the core 3 is positioned just above the light emitting element 5. A material for the formation of the core 3 is typically a photosensitive resin, which has a greater refractive index than the material for the formation of the second under-cladding layer 22 and a material for formation of an over-cladding layer 4 (see FIG. 2(e)) to be described later. The refractive index may be adjusted, for example, by selection of the types of the materials for the formation of the second under-cladding layer 22, the core 3 and the over-cladding layer 4 and adjustment of the composition ratio thereof. The formation of the core 3 is achieved in the following manner. A varnish prepared by dissolving the photosensitive resin in a solvent is applied on the under-cladding layer 22 in the same manner as described above. The application of the varnish is achieved in the same manner as described above, for example, by a spin coating method, a dipping method, a casting method, an injection method, an ink jet method or the like. Then, the varnish is dried to form a resin layer. The drying is typically achieved by a heat treatment at 50° C. to 120° C. for 10 to 30 minutes.

Then, the resin layer is exposed to radiation through a photo mask (not shown) formed with an opening pattern corresponding to a pattern of the core 3. An exposed portion of the resin layer serves as the core 3 after an unexposed portion removing step. More specifically, examples of the radiation for the exposure include visible light, ultraviolet radiation, infrared radiation, X-rays, α-rays, β-rays and γ-rays. Preferably, the ultraviolet radiation is used. The use of the ultraviolet radiation permits irradiation at a higher energy to provide a higher curing speed. In addition, a less expensive smaller-size irradiation apparatus can be employed, thereby reducing production costs. Examples of a light source for the ultraviolet radiation include a low-pressure mercury-vapor lamp, a high-pressure mercury-vapor lamp and an ultra-high-pressure mercury-vapor lamp. The dose of the ultraviolet radiation is typically 10 to 10000 $mJ/cm^2$, preferably 50 to 3000 $mJ/cm^2$.

After the exposure, a heat treatment is performed to complete a photoreaction. The heat treatment is performed at 80° C. to 250° C., preferably at 100° C. to 200° C., for 10 seconds to two hours, preferably for five minutes to one hour. Thereafter, a development process is performed by using a developing agent to dissolve away an unexposed portion of the resin layer. Thus, the remaining portion of the resin layer has the pattern of the core 3. Exemplary methods for the development include an immersion method, a spray method and a puddle method. Examples of the developing agent include an organic solvent and an organic solvent containing an alkaline aqueous solution. The developing agent and conditions for the development are properly selected depending on the composition of the photosensitive resin.

Then, the developing agent in the remaining resin layer having the pattern of the core 3 is removed by a heat treatment. The heat treatment is typically performed at 80° C. to 120° C. for 10 to 30 minutes. The remaining resin layer thus patterned serves as the core 3. The core 3 typically has a thickness of 5 to 30 μm, and typically has a width of 5 to 30 μm.

Figure 2E:
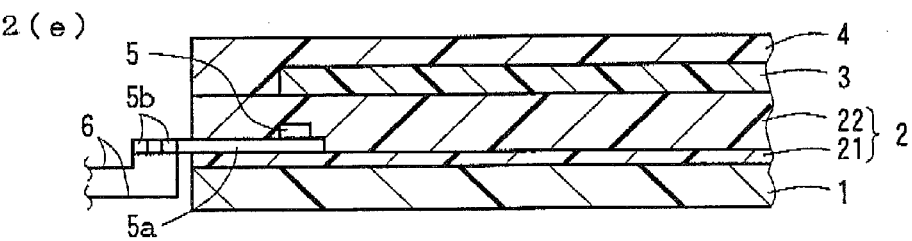
Figure 2F:
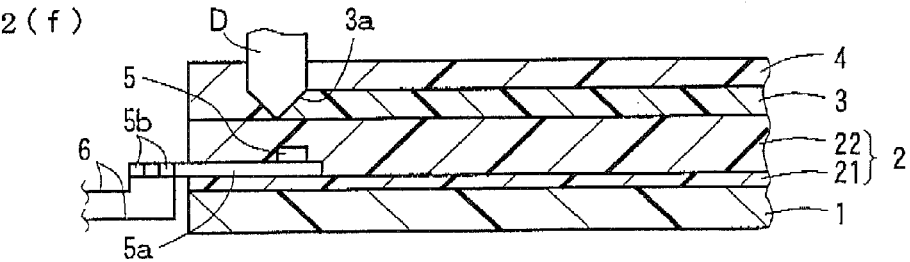

Then, as shown in FIG. 2(e), an over-cladding layer 4 is formed on the upper surface of the second under-cladding layer 22 to cover the core 3. Examples of a material for the formation of the over-cladding layer 4 include those employed as the materials for the first and second under-cladding layers 21, 22. The material for the formation of the over-cladding layer 4 may be the same as or different from the materials for the formation of the first and second under-cladding layers 21, 22. The formation of the over-cladding layer 4 is achieved in the same manner as the formation of the first or second under-cladding layer 21, 22. The thickness of the over-cladding layer 4 is typically 20 to 100 μm.

Further, the terminals (wiring connection portions) 5b of the light emitting element 5 are respectively connected to wirings 6 by a wire bonding method or the like.

Then, the one end portion of the core 3 is cut by moving a disk-shaped rotary blade D having an edge angle of 90 degrees downward toward the bottom surface of the core 3 from above the over-cladding layer 4 while rotating the rotary blade D. Thus, the core 3 has a surface 3a inclined at an angle of 45 degrees with respect to the bottom surface of the core 3.

Thus, the optical waveguide device (see FIG. 1) including the under-cladding 2 having the light emitting element 5 buried therein, the core 3 and the over-cladding layer 4 is produced on the upper surface of the substrate 1.

Figure 3:
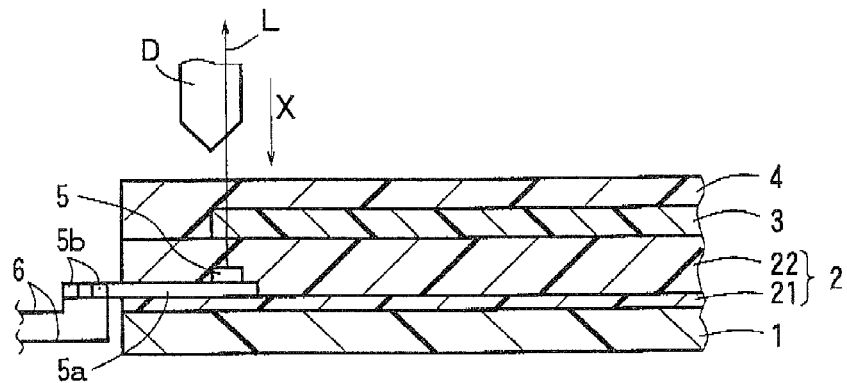
FIG. 3 is an explanatory diagram schematically illustrating a modification of the optical waveguide device production method.

In the embodiment described above, when the one end portion of the core 3 is cut, the light beam L is projected vertically upward from the light emitting element 5 as shown in FIG. 3. At this time, the projected light may be employed as a reference, and the rotary blade D may be moved down in an arrow direction X along a light projection axis (with a rotating surface of the rotary blade D being oriented along the light projection axis) for the cutting. For the cutting, the rotary blade D is positioned so that a generally middle portion of the inclined surface 3a to be formed intersects the light projection axis (in FIG. 3, a widthwise center of the rotary blade D is illustrated as being offset to the left side from the light projection axis). By employing the light projection as the reference, the positioning of the rotary blade D for the cutting is facilitated, so that the inclined surface 3a can be more accurately and easily positioned.

Figure 4:
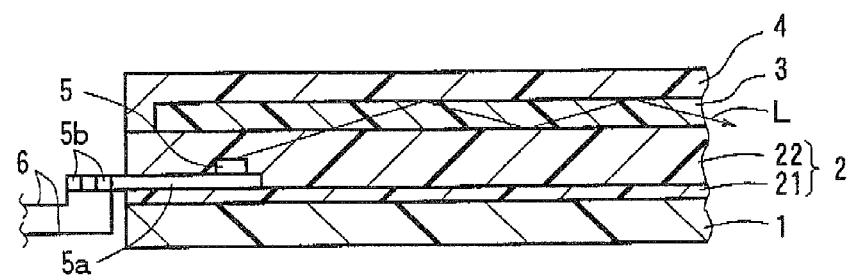
FIG. 4 is an explanatory diagram schematically illustrating a modification of the optical waveguide device.
Figure 5:
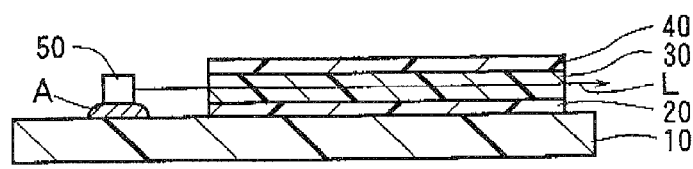
FIG. 5 is a sectional view schematically illustrating a conventional optical waveguide device.

In the embodiment described above, the light beam is projected vertically upward from the light emitting element 5, and the end surface 3a of the core 3 inclined at an angle of 45 degrees is positioned just above the light emitting element 5. However, this arrangement is not limitative. For example, the light beam may be projected obliquely upward from the light emitting element 5, and a portion (light receiving portion) of the core 3 may be positioned with respect to the light projection axis in an optical waveguide device as shown in FIG. 4. That is, an intermediate portion (light receiving portion) of the core 3 is positioned obliquely upward of the light emitting element 5 with respect to the light projection axis in the optical waveguide device shown in FIG. 4. In this optical waveguide device, the light beam L is incident on the portion (light receiving portion) of the core 3, and travels longitudinally in the core 3 while being repeatedly reflected in the core 3. In this case, there is no need to form the inclined surface 3a (see FIG. 1) on the one end portion of the core 3.

The over-cladding layer 4 is provided in the embodiments described above (see FIGS. 1 and 4), but the over-cladding layer 4 is not essential. The optical waveguide device may be configured without the provision of the over-cladding layer 4.

Next, an inventive example will be described. However, the present invention is not limited to the example.

EXAMPLE

Material for Formation of First and Second Under-Cladding Layers and Over-Cladding Layer A material for formation of first and second under-cladding layers and an over-cladding layer was prepared by mixing 35 parts by weight of bisphenoxyethanolfluorenediglycidyl ether (Component A), 40 parts by weight of 3',4'-epoxycyclohexylmethyl-3,4-epoxycyclohexane carboxylate which is an alicyclic epoxy resin (CELLOXIDE 2021P manufactured by Daicel Chemical Industries, Ltd.) (Component 13), 25 parts by weight of (3',4'-epoxycyclohexane)methyl-3',4'-epoxycyclohexyl-carboxylate (CELLOXIDE 2081P manufactured by Daicel Chemical Industries, Ltd.) (Component C), and 1 part by weight of a 50% propione carbonate solution of 4,4'-bis[di(β-hydroxyethoxy)phenylsulfinio]phenylsulfide bishexafluoroantimonate (photoacid generator, Component D).

Material for Formation of Core

A material for formation of a core was prepared by dissolving 70 parts by weight of the aforementioned component A, 30 parts by weight of 1,3,3-tris{4-[2-(3-oxetanyl)]butoxyphenyl}butane and 0.5 part by weight of the aforementioned component D in 28 parts by weight of ethyl lactate.

Production of Optical Waveguide Device

The first under-cladding layer material was applied on an upper surface of a glass substrate (having a thickness of 1.0 mm) by a spin coating method, and then irradiated with ultraviolet radiation at 2000 mJ/cm$^2$. Subsequently, a heat treatment was performed at 100° C. for 15 minutes, whereby a first under-cladding layer (having a thickness of 15 μm) was formed.

Next, a light emitting diode was tentatively fixed to an upper surface of the first under-cladding layer with the use of a very small amount of a UV-curable adhesive.

Then, a second under-cladding layer (having a thickness of 10 μm) was formed on the upper surface of the first under-cladding layer in the same manner as in the formation of the first under-cladding layer to cover the light emitting diode.

Subsequently, the core material was applied on an upper surface of the second under-cladding layer by a spin coating method, and dried at 100° C. for 15 minutes. In turn, a synthetic quartz photo mask having an opening pattern conformable to a core pattern was placed above the resulting core material film. After the core material film was exposed to ultraviolet radiation emitted from above at 4000 mJ/cm$^2$ by a contact exposure method, a heat treatment was performed at 120° C. for 15 minutes. Subsequently, a development process was performed by using a γ-butyrolactone aqueous solution to dissolve away an unexposed portion, and then a heat treatment was performed at 120° C. for 30 minutes, whereby a core (having a sectional size of 12 μm (width)×24 μm (height)) was formed.

In turn, the over-cladding layer material was applied on the second under-cladding layer to cover the core by a spin coating method, and then irradiated with ultraviolet radiation at 2000 mJ/cm$^2$. Subsequently, a heat treatment was performed at 150° C. for 60 minutes. Thus, an over-cladding layer (having a thickness of 35 μm) was formed.

Then, wirings were respectively connected to terminals of the light emitting diode by a wire bonding method.

Subsequently, light was projected vertically upward from the light emitting diode and, in this state, a rotary blade having an edge angle of 90 degrees was moved down from above the over-cladding layer along a light projection axis by means of a dicing machine (Model 522 available from Disco Corporation) to cut one end portion of the core at an angle of 45 degrees with respect to a bottom surface of the core to form an inclined surface on the one end portion.

Thus, an optical waveguide device including the under-cladding having the light emitting diode buried therein, the core and the over-cladding layer was produced on the substrate.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

What is claimed is:

1. An optical waveguide device manufacturing method comprising the steps of:
    forming a first under-cladding layer;
    placing a lead frame on an upper surface of the first under-cladding layer,
        wherein the lead frame comprises a first end portion on which a light emitting element is fixed and a second end portion being provided with terminals of the light emitting element,
        wherein the second end portion projects in a parallel direction to the upper surface of the first under-cladding layer from a rim of a side edge of the first under-cladding layer, the side edge being on a side of the first under-cladding layer that connects perpendicularly to the upper surface of the first under-cladding layer,
        wherein the second end portion being provided with the terminals is exposed in the air, and
        wherein the second end portion being provided with the terminals does not contact the first under-cladding layer;
    connecting the terminals to wirings;
    forming a second under-cladding layer to be in contact with the upper surface of the first under-cladding layer,
        wherein the second under-cladding layer is in contact with a top surface and periphery surfaces of the light emitting element,
        wherein the second under-cladding layer is in contact with a top surface and periphery surfaces of the first end portion of the lead frame,
        wherein the second under-cladding layer is not in contact with the second end portion of the lead frame, and
        wherein the light emitting element is buried in an under-cladding layer, the under-cladding layer including the first under-cladding layer and the second under-cladding layer stacked one on the other; and
    forming a core on an upper surface of the second under-cladding layer in a position such that light emitted from the light emitting element is incident on the core, the core being adapted to receive the emitted light through the second under-cladding layer.

2. An optical waveguide device manufacturing method as set forth in claim 1,
    wherein a light-receiving end surface of the core is formed inclined at an angle of 45 degrees with respect to a bottom surface of the core and positioned so that the light emitted from the light emitting element is projected at an angle of 45 degrees with respect to the inclined surface.

3. An optical waveguide device manufacturing method as set forth in claim 2,
    wherein one end portion of the core is cut by projecting light from the light emitting element, moving a blade having an edge angle of 90 degrees along a light projection axis of the light emitting element, and making a generally middle portion of the inclined surface to be formed intersect the light projection axis for formation of the inclined light-receiving end surface of the core.

* * * * *